United States Patent
Hong et al.

(10) Patent No.: US 9,470,393 B2
(45) Date of Patent: Oct. 18, 2016

(54) OPTICAL PLATE AND ILLUMINATING MEMBER USING THE SAME

(75) Inventors: Beom Sun Hong, Seoul (KR); Dong Mug Seong, Seoul (KR); Jun Phill Eom, Seoul (KR); Dong Hyun Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 14/130,160

(22) PCT Filed: Jun. 29, 2012

(86) PCT No.: PCT/KR2012/005165
§ 371 (c)(1),
(2), (4) Date: Dec. 30, 2013

(87) PCT Pub. No.: WO2013/002596
PCT Pub. Date: Jan. 3, 2013

(65) Prior Publication Data
US 2014/0133160 A1    May 15, 2014

(30) Foreign Application Priority Data
Jun. 29, 2011 (KR) .................. 10-2011-0063456

(51) Int. Cl.
*F21V 5/00*    (2015.01)
*G02B 3/00*    (2006.01)
*G02B 5/02*    (2006.01)

(52) U.S. Cl.
CPC ............. *F21V 5/004* (2013.01); *G02B 3/0056* (2013.01); *G02B 5/0215* (2013.01); *G02B 5/0278* (2013.01)

(58) Field of Classification Search
CPC    G02B 6/0053; G02B 3/0056; G02B 5/0278; F21V 5/004
USPC ........................................................ 362/330
See application file for complete search history.

(56) References Cited

U.S. PATENT DOCUMENTS

| | | | | |
|---|---|---|---|---|
| 2006/0109443 A1* | 5/2006 | Toyoda | ................ | G02B 3/0056 355/67 |
| 2007/0041097 A1* | 2/2007 | Wu | ...................... | G02B 3/0056 359/619 |
| 2007/0070507 A1* | 3/2007 | Yee | ...................... | G02B 3/0018 359/622 |
| 2009/0296024 A1* | 12/2009 | Kanaya et al. | ................. | 349/64 |
| 2010/0316959 A1* | 12/2010 | Gates | ................... | G02B 3/0056 430/321 |

FOREIGN PATENT DOCUMENTS

| | | |
|---|---|---|
| CN | 101322054 A | 12/2008 |
| JP | 2004-191611 A | 7/2004 |
| JP | 4294306 B2 | 7/2009 |
| JP | 4633369 B2 | 2/2011 |
| KR | 10-2009-0083688 | 8/2009 |
| KR | 10-2010-0126393 A | 12/2010 |

OTHER PUBLICATIONS

English translation of Masakazu JP4294306 (B2).*
Office Action dated Sep. 25, 2014 in Taiwanese Application No. 101123569.
International Search Report in International Application No. PCT/KR2012/005165, filed Jun. 29, 2012.

* cited by examiner

*Primary Examiner* — Evan Dzierzynski
(74) *Attorney, Agent, or Firm* — Saliwanchik, Lloyd & Eisenschenk

(57) ABSTRACT

Disclosed is an optical plate and an illuminating member, and particularly an optical plate for reducing UGR, which has a plurality of micro lens patterns formed on a base substrate, a fill factor of the micro lens patterns being in range of 0.5 to 1.0.

17 Claims, 5 Drawing Sheets

(Prior Art)

Fig. 5
| fill factor | UGR(endwise) | UGR(crosswise) |
|---|---|---|
| 82% | 16.3 | 16.2 |
| 78% | 16.5 | 16.4 |
| 75% | 16.6 | 16.5 |
| 72% | 16.7 | 16.6 |
| 69% | 16.8 | 16.7 |
| 66% | 16.9 | 16.8 |
| 63% | 16.9 | 16.9 |
| 60% | 17 | 17 |
| 58% | 17 | 17.1 |
| 56% | 17.1 | 17.1 |
| 54% | 17.2 | 17.2 |
| 52% | 17.3 | 17.3 |
| 50% | 17.3 | 17.3 |
Fig. 6
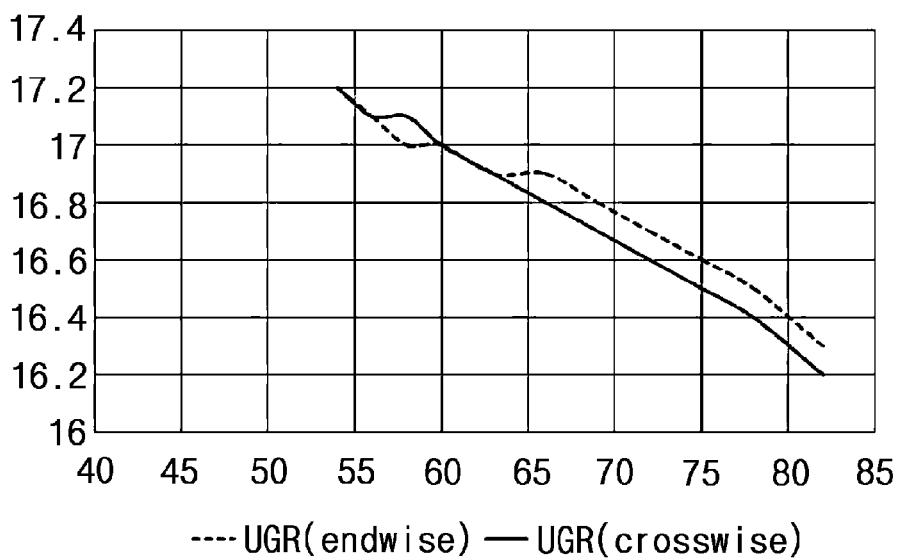
---- UGR(endwise) ——UGR(crosswise)
Fig. 7
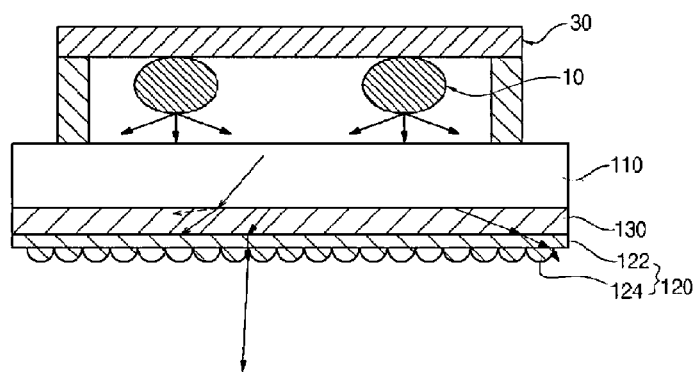

OPTICAL PLATE AND ILLUMINATING MEMBER USING THE SAME

CROSS-REFERENCE TO RELATED APPLICATION

This application is the U.S. national stage application of International Patent Application No. PCT/KR2012/005165, filed Jun. 29, 2012, which claims priority to Korean Application No. 10-2011-0063456, filed Jun. 29, 2011, the disclosures of each of which are incorporated herein by reference in their entirety.

TECHNICAL FIELD

The present invention relates to an optical plate and an illuminating member using the optical plate.

This application claims priority to Korean Patent Application No. 10-2011-0063456, filed on Jun. 29, 2011, in the Korean Intellectual Property Office, the entire contents of which are hereby incorporated by reference.

BACKGROUND ART

Generally, lighting is an activity or a function to brighten a certain place using various light sources with a particular purpose. Lighting is mostly used to make an environment brighter in the night or in the dark.

FIG. 1 is a cross-sectional view illustrating a flat light device according to an exemplary embodiment of a conventional art. Referring to FIG. 1, the light device according to the present exemplary embodiment of the conventional art includes a light source 10 and a louver or a reflecting shade 20. As for the light sources 10, an incandescent light bulb, an LED, a CCFL, or the like may be used. Referring to FIG. 1, light at angles denoted with dotted lines causes visual discomfort to a person when it is transferred to the person. Such a lighting device may reduce the UGR mechanically, but cannot be aesthetic or perfect flat lighting.

FIG. 2 is a cross-sectional view illustrating a flat lighting device according to another exemplary embodiment of a conventional art. Referring to FIG. 2, a lighting device 30 includes a light source 10 and a diffusion plate 40 for diffusing light emitted from the light source 10. The light emitted from the light source 10 is discharged to the outside through the diffusion plate 40. The diffusion plate is used for reducing a hot spot of the light source and emitting uniformly light. Even if the diffusion plate 40 is used, as shown in FIG. 2, light at the angles denoted with the dotted lines still gives discomfort to the eyes of a person. That is, the diffusion plate 40 scatters the light up to a direction in which the UGR is highly generated, thereby causing glare, such that a user's eyes become tired, which does not meet the standard of an indoor flat lighting device.

Accordingly, it is important to reduce the glare in indoor flat lighting. The degree of discomfort due to the glare is represented using a constant called UGR (Unified Glare Rating). That is, the UGR is a value calculated by quantifying the degree of discomfort giving to the user of a lighting device.

The UGR is calculated as the value of a light flux emitted at an angle between 65 deg and 90 deg when a direction facing a bottom surface from a ceiling provided with a lighting device is set to 0 deg and a direction parallel to the ceiling is set to 90 deg. That is, the glare will reduce when the light flux emitted at the angle between 65 deg and 90 deg is reduced. In Europe and US, an indoor lighting device has to be UGR of less than 19.

DISCLOSURE OF INVENTION

Technical Problem

Like this, most currently used indoor flat lighting devices reduce a light spreading angle into a broad range which affects the UGR, by using a reflecting shade or a louver, or burying the whole lighting device. According to the conventional art, even though the diffusion plate is used, the influence of a hot spot may be reduced, but which is still not conformable with the UGR standard of less than 19.

Solution to Problem

As aspect of the present invention provides a technology capable of realizing effective UGR conditions by adjusting a fill factor of a pattern of an optical plate having a structure in which a micro lens array is patterned on a transparent plate, and reducing a light flux emitted at an angle between 65 deg and 90 deg.

According to an aspect of the present invention, there is provided an optical plate for reducing UGR (Unified Glare Rating), which has a plurality of micro lens patterns formed on a base substrate, a fill factor of the micro lens patterns being in a range of 0.5 to 1.0. In particular, in this case, sag (a height H: a diameter R of a lens) of the micro lens patterns is implemented to satisfy a range of 0.1 to 0.5 to thereby maximize reduction efficiency of the UGR.

Moreover, according to an exemplary embodiment of the present invention, an illuminating member is implemented using the aforesaid optical plate. The illuminating member may include a diffusion unit for diffusing and radiating light incident from a light source; and a condensing unit disposed on a light radiating surface of the diffusion unit, and including the optical plate according to the present invention in which a fill factor of micro lens patterns formed on a base substrate is in a range of 0.5 to 1.0.

Advantageous Effects of Invention

In accordance with exemplary embodiments of the present invention, the present invention has the effect capable of realizing effective UGR conditions by adjusting the fill factor of the pattern of the optical plate having the structure in which the micro lens array is patterned on the transparent plate, and reducing the light flux emitted at the angle between 65 deg and 90 deg.

Furthermore, by providing a structure in which an air gap is included between the optical plate according to the present invention and the illuminating member having the diffusion unit, it is advantageous that the reduction efficiency of UGR can be maximized.

BRIEF DESCRIPTION OF DRAWINGS

The above and other aspects, features and advantages of certain exemplary embodiments of the present invention will be more apparent from the following description taken in conjunction with the accompanying drawings, in which:

FIG. 5 and FIG. 6 are the results of an UGR simulation based on a fill factor of micro lens patterns of the optical plate according to the present invention.

FIG. 7 is a cross-sectional concept view illustrating an illuminating member including the optical plate according to the present invention and a lighting device using the same.

MODE FOR THE INVENTION

Figure 1:
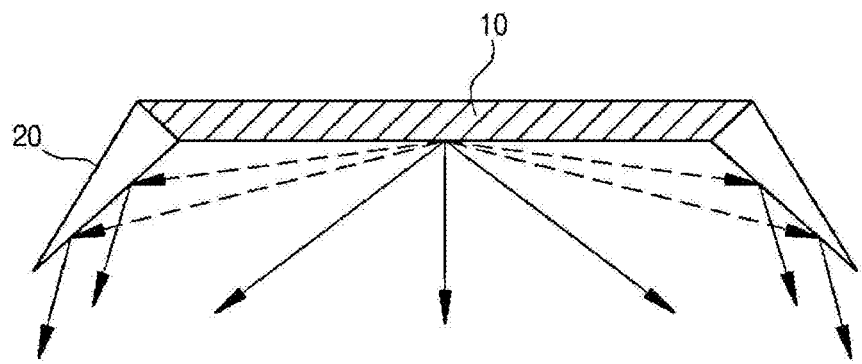
FIG. 1 is a cross-sectional view illustrating a flat lighting device according to an exemplary embodiment of a conventional art.
Figure 2:
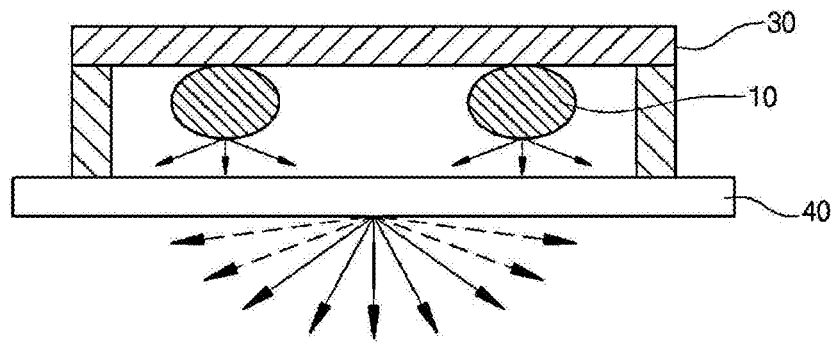
FIG. 2 is a cross-sectional view illustrating a flat lighting device according to another exemplary embodiment of the conventional art.

Exemplary embodiments according to the present invention will now be described more fully hereinafter with reference to the accompanying drawings. In the explanation with reference to the accompanying drawings, regardless of reference numerals of the drawings, like numbers refer to like elements through the specification, and repeated explanation thereon is omitted. Terms such as a first term and a second term may be used for explaining various constitutive elements, but the constitutive elements should not be limited to these terms. These terms is used only for the purpose for distinguishing a constitutive element from other constitutive element.

Figure 3:
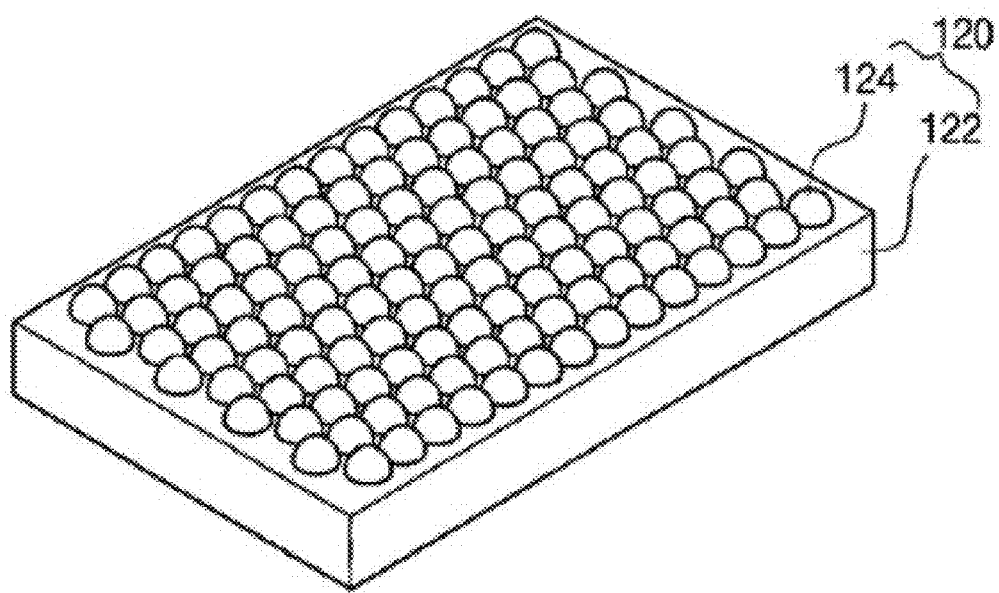
FIG. 3 is a perspective view illustrating an exemplary embodiment of an optical plate according to the present invention.

FIG. 3 is a perspective view illustrating an exemplary embodiment of an optical plate according to the present invention.

An optical plate 120 according to the present exemplary embodiment of the invention has a plurality of micro lens patterns 124 formed on a base substrate 122, and a fill factor of the micro lens patterns 124 satisfies a range of 0.5 to 1.0. In this case, the fill factor is defined as an occupied area rate of the micro lens pattern per each unit area of the base substrate.

In the present invention, the fill factor of the micro lens patterns formed on a surface of the optical plate 120 transmitting light is implemented in a range of 50% to 100% to thereby reduce UGR when a light source is transmitted.

Figure 4:
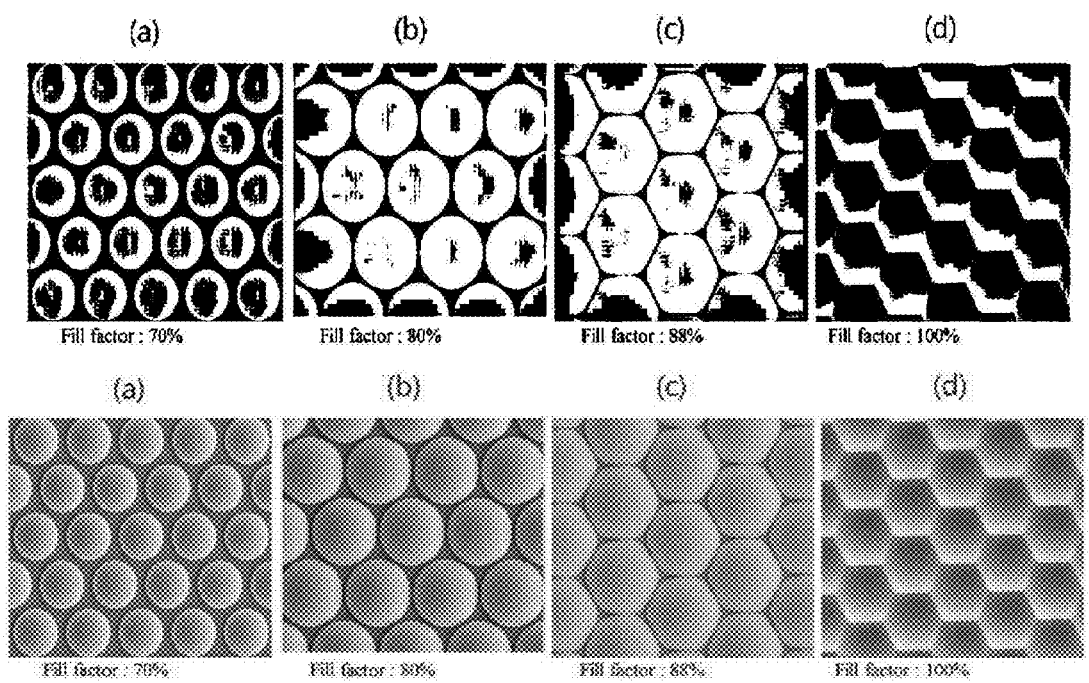
FIG. 4 is a really implemented image of a fill factor according to the present invention.

FIG. 4 illustrates a really implemented image of the fill factor according to the present invention. (a), (b), (c) and (d) are images that fill factors of 70%, 80%, 88%, and 100% are implemented, respectively. Of course, the illustrated structure illustrates a structure in which shapes of the micro lens patterns are uniformly disposed in the same shapes and sizes as each other. However, unlike this, the micro lens patterns having the different shapes from each other may be non-uniformly disposed. Moreover, the shape of a lens may have a shape of one of a circle, an oval, a prism, a lenticular, an R-prim and a pyramid. In particular, in the case of the fill factor of 100%, a cross-section shape of the lens pattern may be implemented in a polygonal (hexagonal, octagonal and the like) structure other than a circle structure.

Referring to FIG. 5 and FIG. 6, this is the results of an UGR simulation based on the fill factor of the micro lens patterns of the optical plate according to the present invention (based on a lens size: 80 µm, and lens sag: 0.45). Reviewing the illustrated results, as the fill factor of the lens patterns in the same sag increases, the UGR is reduced.

In particular, as previously described in the conventional art, when the UGR satisfies the range of less than 19, it would be possible to apply it to a lighting device. In view of this, a structure in which the fill factor of the lens patterns of the optical plate of the present invention is adjusted by 50% to 82% may implement an UGR value in a range of 16.3 to 17.3. Of course, like a correlation of the structure of experimental data of FIG. 5 presented in FIG. 6, when the fill factor ranges from more than 82% to 100%, the UGR value is more reduced.

Of course, when the fill factor is less than 50%, there is also a case that the UGR value becomes less than 19. However, in such a case, the haze of a lens consisting of the optical plate is reduced, and thus optical transmittance increases. Due to this, it is problematic that a hot spot caused by the light source such as an LED and the like becomes visible to the outside of the light device, such that a condensing effect of the lens is largely reduced, thereby being unable to perform a function as the lighting device.

Furthermore, the base substrate 122 of the optical plate 120 may basically use a synthetic resin of a transparent material, and for example, one of PC, PMMA and PET films.

In addition, the micro lens patterns 124 formed on the surface of the base substrate may be integrally formed with the surface of the base substrate, or may be implemented by a process of applying and patterning a separate resin. For example, the micro lens patterns may be integrally implemented by molding the transparent plate using heat and pressure, or may be formed by applying the resin on the transparent plate and curing the transparent plate using heat and pressure. Specifically, a first method is to form a micro lens array by preparing a transparent plate and molding the transparent plate using heat and pressure. The first method includes a press method, a direct working method and the like. A second method is to form the micro lens array by preparing a transparent plate, coating the transparent plate with an UV curing resin, for example, a resin, and curing the transparent plate using heat and light. The second method includes an imprinting method, a direct roll printing method and the like. The transparent plate may be manufactured of PC, PMMA, PET films and the like. Thus, the micro lens array according to the present invention has a high replication ratio and is also easy to process even in any process. Furthermore, the loss of an original material can be also minimized.

In particular, a size of each unit lens pattern of the micro lens patterns 124 may range from 20 µm to 80 µm, and sag (a ratio of a height H to a diameter of the lens R) of the micro lens patterns may satisfy the range of 0.1 to 0.5. That is, the optical plate 120 according to the present invention may be applied to a lighting device including the light source which will be described later, and may more reduce the UGR value in the aforesaid range. That is, in the case of a flat lighting device of general lighting devices, to equally emit light while shielding a light source, only a diffusion plate is used. However, because the diffusion plate scatters the light up to a direction in which UGR is highly generated, glare occurs, such that the user's eyes become tired. This does not meet a standard for an indoor lighting device.

In the present invention, to reduce the UGR, the optical plate in which the micro lens array is patterned is used. In particular, the fill factor of the micro lens patterns is adjusted in a range of 0.5 to 1.0, and at the same time, the sag of the micro lens patterns is formed in a range of 0.1 to 0.25 or 0.35 to 0.5, thereby being capable of satisfying the UGR of less than 19. Particularly, in the present invention, in the same sag, the fill factor of the micro lens array increases, thereby showing the result that the UGR is reduced. In a region (i.e. 0.35 to 0.5) in which the sag of the lens patterns is high, it is disadvantageous that the UGR is lowered, and at the same time, light efficiency is reduced. Thus, in a region (0.1 to 0.25) in which the sag of the lens patterns is low, as the fill factor increases, the UGR is lowered and the light efficiency is prevented from being lowered. Therefore, the sag may be formed in the range of 0.1 to 0.25.

That is, in the present invention, by adjusting the fill factor in the sag of a specific value, the UGR value can be additionally adjusted to be more lowered.

FIG. 7 is a cross-sectional concept view illustrating an illuminating member including the optical plate 120 according to the present invention and the lighting device using the same.

The illuminating member according to still another exemplary embodiment of the present invention may include: a diffusion unit 110 for diffusing and radiating light incident from a light source 10; a condensing unit disposed on a light radiating surface of the diffusion unit, and including the optical plate 120 in which a fill factor of the micro lens patterns 124 formed on a base substrate 122 ranges from 0.5 to 1.0. The condensing unit is a concept including the optical plate.

FIG. 7 illustrates a lighting device including the aforesaid illuminating member according to the present exemplary embodiment of the invention. The lighting device according to the present exemplary embodiment of the invention condenses light in such a manner that when light emitted from a layer of the light source 10 mounted in a layer of a lighting device 30 is touched on a surface of the optical plate, the condensing unit, passing through the diffusion unit 110, the light is refracted downward along the lens patterns 124 of the optical plate 120, the condensing unit.

In particular, in this case, the optical plate and the diffusion unit may be implemented in a structure in which they are combined via a separate fixing member. In addition, a low refraction layer 130 formed as an adhesive layer may be further included between the diffusion unit 110 and the optical plate 120. In this case, light which will be refracted like dotted lines is refracted like continuous lines due to a refractive index of the low refraction layer 130. In addition, the light passing through the low refraction layer 130 is refracted downward once again along the lens patterns 124 of the surface of the optical plate which is the condensing layer having a higher refraction index than the low refraction layer 130, so that the light is condensed. Accordingly, the illuminating member of the present invention primarily reduces glare thanks to the low refraction layer 130, and secondarily reduces the glare thanks to the condensing layer 130, thereby meeting the suitable numerical values of UGR. As one example of the low refraction layer, one of an OCA (optically clear adhesive), an UV adhesive, and an UV resin may be used. Furthermore, beeds or bubbles may be formed in an inner part of the diffusion unit 110.

Figure 8:
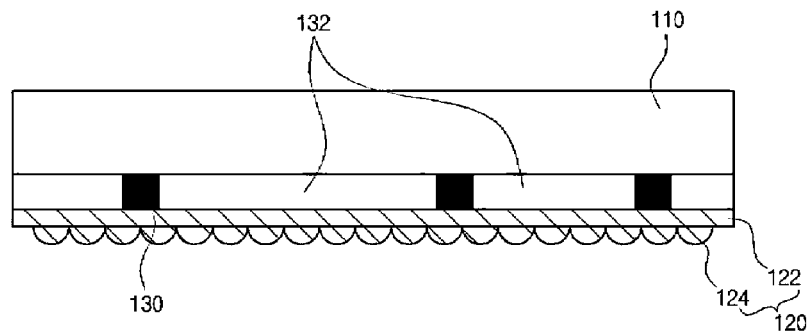
FIG. 8 illustrates another exemplary embodiment of the illuminating member including a diffusion unit and the optical plate according to the present invention.

FIG. 8 illustrates still another exemplary embodiment of the illuminating member including the diffusion unit 110 and the optical plate 120 according to the present invention.

Like the illustrated structure, the present exemplary embodiment may be implemented in a structure in which an air gap 132 is provided between the optical plate 120 and the diffusion unit 110. The illustrated structure shows one exemplary embodiment in which an adhesive layer 130 is patterned so that the air gap 132 having fixed gaps is formed between the optical plate 120 and the diffusion unit 110. However, without a separate adhesive layer, the optical plate 120 and the diffusion unit 110 may be stocked in a touched structure. Even in a case that they are fixed by a separate fixing member, a fine air gap may be formed.

By a function of the air gap, the light passing through the diffusion unit 110 is refracted by the air gap 132 to thereby enter into the optical plate 120. Thus, among lights passing through the diffusion unit 110 and being applied to the air gap, the light which largely scatters from side to side is refracted, and thus is incident to the condensing layer, thereby being capable of reducing the UGR. Of course, in this case, the optical plate 120 has the aforesaid values of the fill factor and sag according to the present invention.

Figure 9:
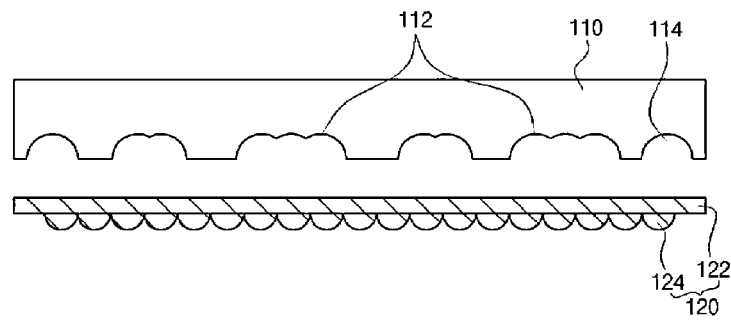
FIG. 9 and FIG. 10 illustrate still another exemplary embodiment of the illuminating member including the diffusion unit and the optical plate according to the present invention.
Figure 10:
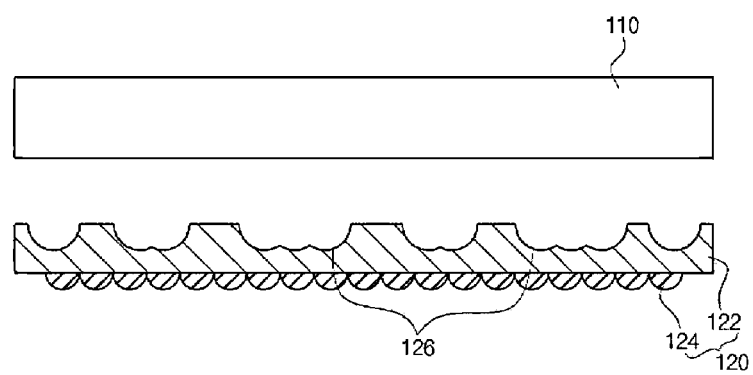

Moreover, a ratio of the areas of the air gap 132 and the adhesive layer 130 in FIG. 8, and a ratio of an area of an air gap 114 and an area of the surface in which the diffuse unit 110 and the optical plate 120 are bordered in FIG. 9 and FIG. 10 are important elements, and the numerical value thereof may range from 6:4 to 9:1.

FIG. 9 and FIG. 10 illustrate still another exemplary embodiments of the illustrating member including the diffusion unit and the optical plate 120 according to the present invention. A difference from FIG. 8 is not to utilize a separate adhesive material as a spacer, and the gist thereof is to form a structure in which a pattern is implemented on one surface itself of the diffuse unit 110 to thereby implement the air gap at the time of being closely attaching to the optical plate 120. That is, an air gap 112 may formed by forming a concave pattern on a light radiating surface of a sheet or a plate. Furthermore, unlike this but like FIG. 10, the air gap may be formed by patterning other surface in which the micro lens patterns of the optical plate are formed.

Figure 11:
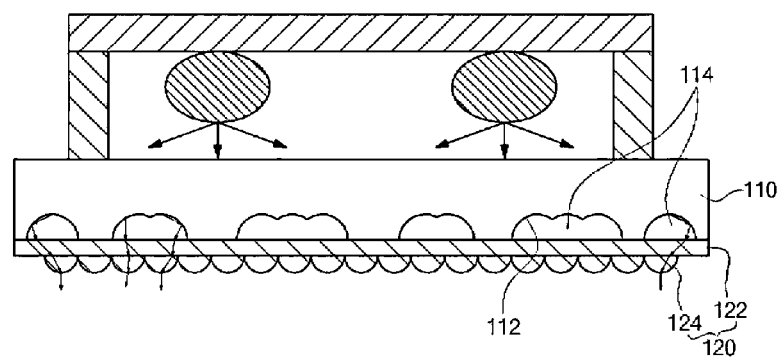
FIG. 11 is a concept view for explaining a function of the lighting device including the illuminating member according to the present invention explained in FIG. 7.

FIG. 11 is a concept view for explaining an operation of the lighting device including the illuminating member according to the exemplary embodiment of the present invention explained in FIG. 7.

Referring to FIG. 11, light emitted from the light source 10 mounted to a lighting device layer 30 passes through the diffuse unit 110, and is incident to the condensing layer 120 through the air gap 114 formed on a lower surface of the diffuse unit. In this case, the light passing through the air gap 114 may be incident to the optical plate 120, which is the condensing layer, by passing through only the air gap 114, or may be incident to the optical plate 120 by being reflected to the concave parts 112 of the diffuse unit 110.

Specifically, the light passing through the air gap 114 after going passing the diffusion unit 110, and being toward the condensing unit 120 is incident directly to the condensing unit 120 in the diffuse unit 110 or is incident to the condensing unit 120 by running into the concave part 112 of the diffusion unit and being reflected.

Like this, the light passing through only the air gap 114, and the light reflected by the concave part 112 of the diffusion unit 110 while passing through the air gap 114 are incident to the condensing layer, namely, the optical plate 120, and are reflected depending on the lens patterns 124 of the optical plate 120 so that the light is condensed. In this case, a reflective index of the optical plate 120 may be higher than 1 of the reflected index of air within the air gap 114, so that the light passing through the air gap 114 is reflected downward. Accordingly, the illuminating member of the present invention reduces primarily the glare via the concave part 112 of the diffusion unit 110 and reduces secondarily the glare via the optical plate 120, thereby being capable of meeting more appropriate numerical values of UGR.

As previously described, in the detailed description of the invention, having described the detailed exemplary embodiments of the invention, it should be apparent that modifications and variations can be made by persons skilled without deviating from the spirit or scope of the invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims and their equivalents.

The invention claimed is:

1. An optical plate, comprising:
    a base substrate;
    a plurality of micro lens patterns formed on a first surface of the base substrate; and
    a low refraction layer disposed on a second surface of the base substrate,
    wherein the second surface of the base substrate is opposite to the first surface of the base substrate,
    wherein a refraction index of the low refraction layer is lower than that of the base substrate,
    wherein a fill factor of the micro lens pattern is in a range of 0.5 to 1.0 to reduce UGR,
    wherein the fill factor is an occupied area rate of the micro lens pattern per each unit area of the base substrate, and
    wherein sag (a ratio of a height H to a diameter of a lens R) of the micro lens patterns is in a range of 0.1 to 0.25.

2. The optical plate of claim 1, wherein the micro lens patterns have the same size as each other or another plurality of micro lens patterns are uniformly or non-uniformly distributed.

3. The optical plate of claim 2, wherein a size of each unit lens pattern of the micro lens patterns is in a range of 20 μm to 80 μm.

4. The optical plate of claim 1, wherein the micro lens patterns are formed in a shape of one of a circle, an oval, a prism, a lenticular, an R-prism and a pyramid.

5. The optical plate of claim 1, wherein the base substrate is a transparent plate using one of PC, PMMA and PET films.

6. The optical plate of claim 5, wherein the micro lens patterns are implemented by integrally forming the lens patterns from molding the transparent plate using heat and pressure.

7. The optical plate of claim 5, wherein the micro lens patterns are formed by coating the transparent plate with a resin and curing it using heat or light.

8. An illuminating member comprising: a diffusion unit for diffusing and radiating light incident from a light source;
    a condensing unit disposed on a light radiating surface of the diffusion unit, and including an optical plate in which a fill factor of micro lens patterns formed on a base substrate is in a range of 0.5 to 1.0; and
    a low refraction layer disposed between the diffusion unit and the condensing unit,
    wherein a refraction index of the low refraction layer is lower than that of the condensing unit,
    wherein the fill factor is an occupied area rate of the micro lens pattern per each unit area of the base substrate, and
    wherein the optical plate is configured such that sag (a ratio of a height H to a diameter of a lens R) of the micro lens patterns is in a range of 0.1 to 0.25.

9. The illuminating member of claim 8, wherein a size of each unit lens pattern of the micro lens patterns is in a range of 20 μm to 80 μm.

10. The illuminating member of claim 8, wherein the diffusion unit is an optical sheet or a substrate.

11. The illuminating member of claim 10, further comprising an air gap formed between the optical plate and the diffusion unit.

12. The illuminating member of claim 11, wherein the air gap is formed by patterning one surface of the diffusion unit.

13. The illuminating member of claim 11, wherein the air gap is formed by patterning a surface of the optical plate in which micro lens patterns are formed.

14. The illuminating member of claim 11, wherein the low refraction layer is at least one of an OCA (optically clear adhesive), an UV adhesive, and an UV resin.

15. The illuminating member of claim 11, wherein the illuminating member meets UGR ranging from 16.0 to 19.0.

16. The illuminating member of claim 10, wherein beads or bubbles are formed in an inner part of the diffusion unit.

17. The illuminating member of claim 10, wherein the illuminating member further comprises an air gap on a surface in which the diffusion unit and the optical plate are bordered, wherein the air gap is patterned on a surface of the diffusion unit or the optical plate, and a ratio of an area of the air gap and an area of the surface in which the diffusion unit and the optical plate are bordered ranges from 6:4 to 9:1.

* * * * *